United States Patent
Mottier

(10) Patent No.: US 7,031,671 B2
(45) Date of Patent: Apr. 18, 2006

(54) MULTI-USER DETECTION METHOD

(75) Inventor: David Mottier, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 841 days.

(21) Appl. No.: 09/935,584

(22) Filed: Aug. 24, 2001

(65) Prior Publication Data

US 2002/0072336 A1    Jun. 13, 2002

(30) Foreign Application Priority Data

Sep. 14, 2000    (FR) .................................. 00 11906

(51) Int. Cl.
  *H03C 7/02*    (2006.01)
(52) U.S. Cl. .................... 455/101; 455/63.1; 455/67.13
(58) Field of Classification Search ................ 455/101, 455/63.1, 137; 375/144, 148
  See application file for complete search history.

(56) References Cited

U.S. PATENT DOCUMENTS

| | | | | |
|---|---|---|---|---|
| 5,550,810 A | * | 8/1996 | Monogioudis et al. ....... | 370/342 |
| 6,115,406 A | * | 9/2000 | Mesecher .................... | 375/130 |
| 6,115,409 A | * | 9/2000 | Upadhyay et al. ........... | 375/144 |
| 6,192,067 B1 | * | 2/2001 | Toda et al. .................. | 375/144 |
| 6,282,233 B1 | * | 8/2001 | Yoshida ....................... | 375/148 |

FOREIGN PATENT DOCUMENTS

EP    0 978 951    2/2000

OTHER PUBLICATIONS

Minami Nagatsuka, et al., IEICE Transactions on Communications, XP-000555376, vol. E78-B, No. 11, pp. 1489-1497, "A Spatially and Temporally Optimal Multi-User Receiver Using an Array Antenna for DS/CDMA", Nov. 1, 1995.
Babak H. Khalaj, et al., IEEE, XP-000535015, pp. 1520-1524, "Spatio-Temporal Channel Estimation Techniques for Multiple Access Spread Spectrum Systems with Antenna Arrays", Jun. 18, 1995.
Mark C. Reed, et al., IEEE Journal on Selected Areas in Communications, XP-000920304, vol. 17, No. 12, pp. 2082-2089, "Iterative Multiuser Detection Using Antenna Arrays and FEC on Multipath Channels", Dec. 1999.

* cited by examiner

Primary Examiner—Fan Tsang
Assistant Examiner—Simon Sing
(74) Attorney, Agent, or Firm—Oblon, Spivak, McClelland, Maier & Neustradt, P.C.

(57) ABSTRACT

Multi-user detection method with elimination of interference between users, each user transmitting modulated data in the form of symbols on a transmission channel, each transmission channel (k) comprising at least one propagation path (i) and each propagation path arriving at an array of reception antennae (l) according to a direction of arrival ($\theta_{i,k}$), the method comprising at least one sequence of steps for each user (k), each sequence comprising:

(a) a reception step ($600_k,700_k,800_k,800,900$) decomposing each antenna signal into filtered signals ($x_{l,i,k}$) issuing from the different paths (i) of the said user (k) and combining the said filtered signals by means of a first plurality of coefficients ($b_{l,i,k}, c_{i,k}$) in order to form an estimation ($z_k$) of the signal transmitted by the user;
  (b) a step of estimating ($670_k,770_k,870_k,870,970$) the contribution (($x_{l,k}$)l=1 . . . L) of the user to the signals received by the different antennae from the said estimation of the signal transmitted and a second plurality of coefficients ($u_{i,k}, w_{l,i,k}$) obtained from the said first plurality of coefficients;
  (c) a step of eliminating interference ($680_k,780_k,880_k,880,980$) subtracting from the antenna signals the contribution estimated at step (b) in order to obtain cleaned antenna signals;
  the cleaned antenna signals supplied by at least one first sequence being used as antenna signals by at least one second sequence.

24 Claims, 12 Drawing Sheets

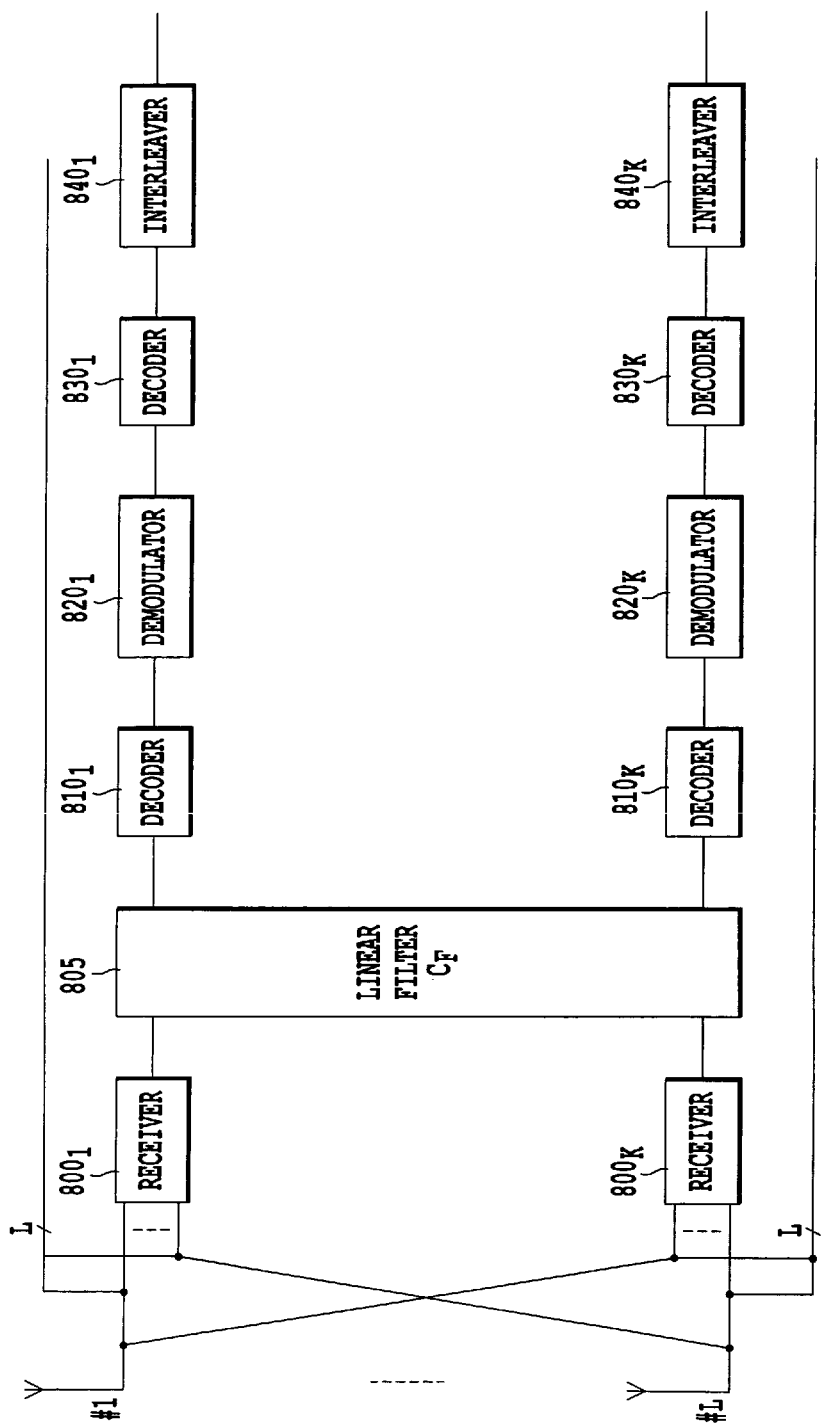
FIG. 8A(1)

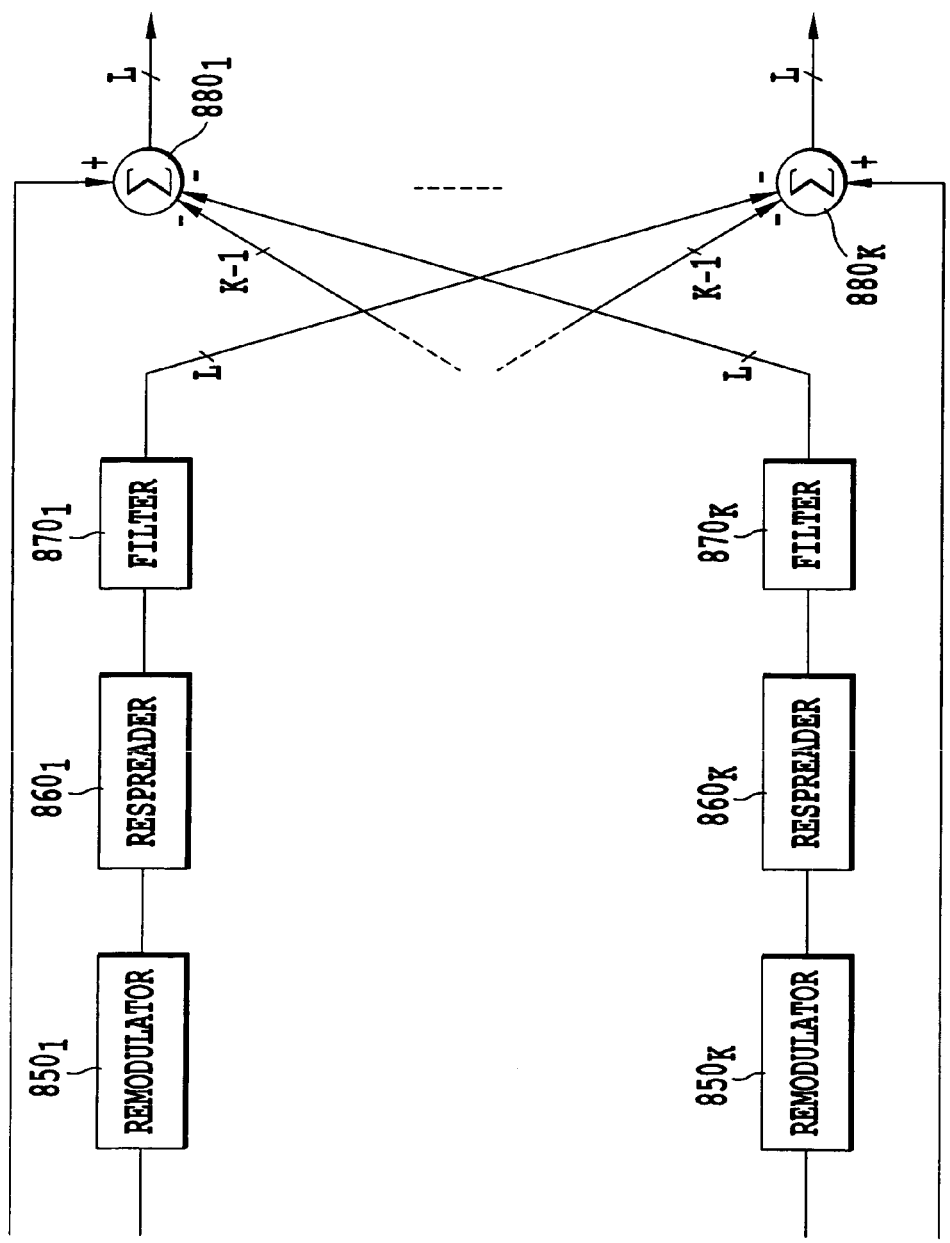
FIG. 8A(2)

MULTI-USER DETECTION METHOD

BACKGROUND OF THE INVENTION

1. Field of the Invention

The present invention concerns in general terms a multi-user detection method (MUD). More precisely, the present invention relates to an iterative method of eliminating interference between users (Multiple Access Interference or MAI). The present invention applies more particularly to mobile telephony in DS-CDMA mode (Direct Sequence—Code Division Multiple Access) that is to say to mobile telephony using a code division access mode with spectral spreading by direct sequences.

2. Description of Related Art

In a DS-CDMA mobile telephony system, the different users are separated by multiplying each symbol of the user by a spreading sequence peculiar to it, also referred to for this reason as the signature of the user, the different signatures ideally being chosen so as to be orthogonal. The spreading sequence frequency (chip rate) being greater than the frequency of the symbols, the signal transmitted by each user is distributed (or spread) in the frequency space. On reception, the signal of a user is separated by virtue of a filtering adapted to the corresponding signature. This filtering is also referred to as "despreading". The ratio between the band occupied by the spread signal and the band occupied by the information signal is referred to as the spread factor.

The signatures employed must have good correlation properties, namely a very pronounced auto-correlation peak and low intercorrelation values.

The first of these two characteristics allows synchronisation of the sequence received. It is very useful when the transmission channel of a user has several propagation paths. This is because each path must then be isolated by virtue of a filtering adapted to the signature and to the delay of the path. It is possible to take advantage of the diversity of propagation within the channel to increase the signal to noise ratio on reception. To do this, a bank of adapted filters, separating the different paths, is used and the outputs of them are combined. The most widespread combination is MRC (Maximum Ratio Combining), which consists of multiplying the signal output from each adapted filter by the conjugate of the complex multiplicative coefficient introduced by the channel on the path concerned. The resulting filtering operation is a filtering adapted to the equivalent filter of the channel. Through its structure, the receiver thus formed is referred to as a rake receiver. Naturally, perfect separation of the paths takes place only if the auto-correlation is a Dirac. In practice, however, separation is not complete and leaves multipath interference which is also referred to as self-noise. FIG. 1 depicts schematically a DS-CDMA system with K users. The data of a user k are spread in frequency by the corresponding signature in the module $100_k$ before being transmitted over the channel $110_k$ having P paths. On reception, for a given user k, the signals being propagated according to the different paths p=1 . . . P of the channel are separated by adapted filters $120_{k,1}$ . . . $120_{k,P}$ (only the battery of filters of the user k has been shown) before being weighted by a set of complex coefficients $c_{k,p}$. The signals thus weighted are summed ($140_k$) and the resulting sum output from the rake receiver is subsequently detected to provide an estimation of the data of the user k. In the case of a downlink (links from a base station to a mobile terminal) the channels 1 to K are identical, whilst they are different in the uplink (links from mobile terminals to the base station). The first case can, from this point of view, be considered to be a particular case of the second.

The second characteristic set out above guarantees a low level of interference between two distinct users. Nevertheless, here also, in practice, the intercorrelation between two signatures is rarely zero. This is notably the case in a so-called dazzle situation (the Near-far effect) where a high-power signal received from a user interferes with the reception of a low-power signal coming from another user. Moreover, when the number of users is high, close to the spread factor, the sum of the interferences of the different users, low if taken in isolation, can have very disturbing effects on detection.

In order to combat the multi-user interference, several methods have been proposed. A review thereof will be found in the article by Simon Moshavi entitled "Multi-user detection for DS-CDMA communications", which appeared in IEEE Communications Magazine, October 1996, pages 124–136. Amongst existing multi-user techniques, the techniques of subtractive elimination (Subtractive Interference Cancellation) have good performance with reasonable complexity in use. The general idea of it is simple; from a first detection at the output of the adapted filter, the contributions to the interference suffered by the other users are reconstructed by respreading. This interference is then subtracted from the signal received in order to provide a cleaned signal at a subsequent detection step. According to the way in which the subtraction is carried out, there may be parallel elimination (PIC, standing for Parallel Interference Cancellation) and serial elimination of interference (SIC, standing for Serial Interference Cancellation).

Let it be assumed first of all that the signal of each user propagates on a single path as far as the receiver.

The parallel elimination method is illustrated in FIG. 2: the received signal is filtered by a battery of adapted filters ($200_1, 200_2, \ldots, 200_K$), each adapted filter relating to a given user. After detection ($210_k$), the estimated symbols are respread ($220_k$) spectrally by means of the signature of the user in question before being filtered by a filter modelling the transmission channel ($230_k$). There is thus, at the output of ($230_k$), an estimation on the contributory share of the signal received attributable to the user k. The sum of the contributory parts of the other users is then subtracted (at ($240_k$)) in order to obtain a cleaned signal $S_k^{(1)}$. This cleaned signal can directly be the subject of detection after despreading or the elimination process can be reiterated. The detection being of better quality at each iteration, there is then obtained, at the end of successive iterations, signals $S_k^{(i)}$ which are more and more rid of the multi-user interference.

The serial elimination method is illustrated in FIG. 3: the signals received by the different users are first of all ordered in decreasing order of power, that is to say 1, . . . , K. The procedure then consists of successive eliminations of the contributory shares, commencing with the signal of highest power. To this end, the SIC detector has a series of stages in cascade, each eliminating the interference due to a particular user. The first stage works on the antenna signal and each subsequent stage receives as an input the output of the previous stage. Each stage has an adapted filter ($300_k$), a detector ($310_k$), a module ($320_k$) for respreading the symbols, a filter ($330_k$) modelling the transmission channel k and a subtractor ($340_k$) eliminating the contribution due to the user k. Each stage also supplies at the output of the detector ($310_k$) a decision on the symbol received, $\hat{S}_k$, and the interference elimination process ends at the $K^{th}$ stage.

The techniques set out above apply well to the simple situation where the transmission channel of a user has a single path. In this case, the filter modelling the channel can be limited to multiplication by a complex coefficient. When the channels are multipath, the situation is on the other hand much more complex since it is necessary to eliminate both the multipath interference and the multi-user interference. An iterative detector with subtractive elimination of the multi-user interference when there are multiple paths was proposed in an article by M. C. Reed et al. entitled "Iterative Multiuser detection using antenna arrays and FEC on multipath channels" published in the IEEE Journal on Selected Areas in Communications, Vol. 17, N° 12, December 1999, pages 2082–2089. Each iteration of the detection comprises an adapted filtering, a channel formation and a combination of the rake type. The method proposed presupposes however that the attenuation coefficients, the phase rotations and the directions of arrival of all the paths of all the users are determined. This determination is carried out externally to the detector, prior to the sequence of iterations and therefore on signals interfered with by multi-user and multipath interference. As a result the elimination of this interference is necessarily approximate.

SUMMARY OF THE INVENTION

A first aim of the invention is to propose a detection method and device which allow elimination of multi-user interference when there are multipath channels without requiring an explicit calculation of the attenuation coefficients, phase rotations and directions of arrival of the paths of the different users.

A second aim of the present invention is to propose a detection method and device which improve the elimination of multi-user and multipath interference.

The object of the invention is defined by a multi-user detection method with elimination of interference between users, each user transmitting modulated data in the form of symbols on a transmission channel, each transmission channel comprising at least one propagation path and each propagation path arriving at an array of reception antennae according to a direction of arrival, the method comprising at least one sequence of steps for each user, each sequence comprising:

(a) a reception step decomposing each antenna signal into filtered signals issuing from the different paths of the said user and combining the said filtered signals by means of a first plurality of coefficients in order to form an estimation of the signal transmitted by the user;

(b) a step of estimating the contribution of the user to the signals received by the different antennae from the said estimation of the signal transmitted and a second plurality of coefficients obtained from the said first plurality of coefficients;

(c) a step of eliminating interference from the cleaned antennae signals;

the cleaned antennae signals supplied by at least one first sequence being used as antennae signals by at least one second sequence.

According to a first embodiment, the first plurality of coefficients comprises a first set of complex coefficients and a second set of complex coefficients and the filtered signals are subjected to a channel formation step in order to form signals of paths by means of the said first set, the said path signals then being linearly combined by means of the said second set in order to supply the said estimation of the signal transmitted, the coefficients of the first set being adapted so as to minimise a plurality of first error signals between a reference value of the transmitted signal and the said path signals, the coefficients of the said second set being adapted so as to minimise a second error signal between the said estimation and the said reference value.

According to one characteristic of the invention, the said second plurality of coefficients comprises a first set of complex coefficients and a second set of complex coefficients, the coefficients in the said first set of the second plurality being obtained from the arguments of the coefficients of the first set of the first plurality and the coefficients of the said second set of the second plurality being obtained from coefficients of the said second set of the first plurality.

Advantageously, the coefficients in the said first set of the second plurality are obtained from a linear regression on the arguments of the coefficients of the first set of the first plurality.

According to a second embodiment of the invention, the first plurality of coefficients consists of a set of complex coefficients and the filtered signals are linearly combined by means of the said set in order to supply the said estimation of the signal transmitted, the coefficients of the said set being adapted so as to minimise an error signal between the said estimation and a reference value.

According to one characteristic of the invention, the said second plurality ($w_{l,i,k}, u_{i,k}$) of coefficients comprises a first set of complex coefficients ($w_{l,i,k}$) and a second set of complex coefficients ($u_{i,k}$), the coefficients ($u_{i,k}$) of the said second set of the second plurality being obtained by: $u_{i,k} = g_{i,k}/g_k$ where $g_{i,k}$ is an estimation of the norm of the sub-vector, $$\overline{b}_{i,k} = \begin{bmatrix} b_{1,i,k} \\ b_{2,i,k} \\ \vdots \\ b_{L,i,k} \end{bmatrix},$$

L being the number of antennae in the array, where $g_k$ is a mean of the $g_{i,k}$ values on the different paths, the coefficients ($w_{l,i,k}$) of the said first set of the second plurality being obtained from the arguments of the coefficients ($b_{l,i,k}$) of the said set of the first plurality.

Advantageously, each sequence comprises a step of estimating the symbols transmitted from the estimation of the signal transmitted in order to obtain first estimated signals, a step of demodulating the first estimated symbols in order to obtain estimated data, a step of channel decoding of the said estimated data followed by a channel recoding and a remodulation in order to obtain second estimated symbols.

According to a second variant of the invention, the users are classified in order of received power and the interference is eliminated by subtracting one after another the contributions of the different users, commencing with the users with the highest received powers.

Advantageously, the estimations of the transmitted signals of the users being considered to be an estimations vector with K components where K is the number of users, the said vector is subjected to a transverse matrix filtering.

In addition, the estimated symbols of the users being considered to be a symbols vector with K components, the said symbols vector can be subjected to a postcursor matrix filtering and the output of this filtering is subtracted, vector by vector, from the output of the transverse matrix filtering.

The invention is also defined by a multi-user detection device comprising means adapted to implement the method disclosed above.

BRIEF DESCRIPTION OF THE DRAWINGS

The characteristics of the invention mentioned above, as well as others, will emerge more clearly from a reading of the description given in relation to the accompanying figures, amongst which:

FIG. 8a depicts a multi-user detection device according to a third embodiment of the invention;

DESCRIPTION OF THE PREFERRED EMBODIMENTS

The general idea at the basis of the invention is to propose an adaptive reception method of the rake type, fitted into a multi-user detection process. The interference rejection process benefits from increased precision by virtue of the estimation of the respective contributions of the different users in the received signal. Conversely, the process of adapting the complex coefficients used in the reception method of the rake type benefits from the rejection of the multi-user interference by operating on the cleaned signals.

Figure 1:
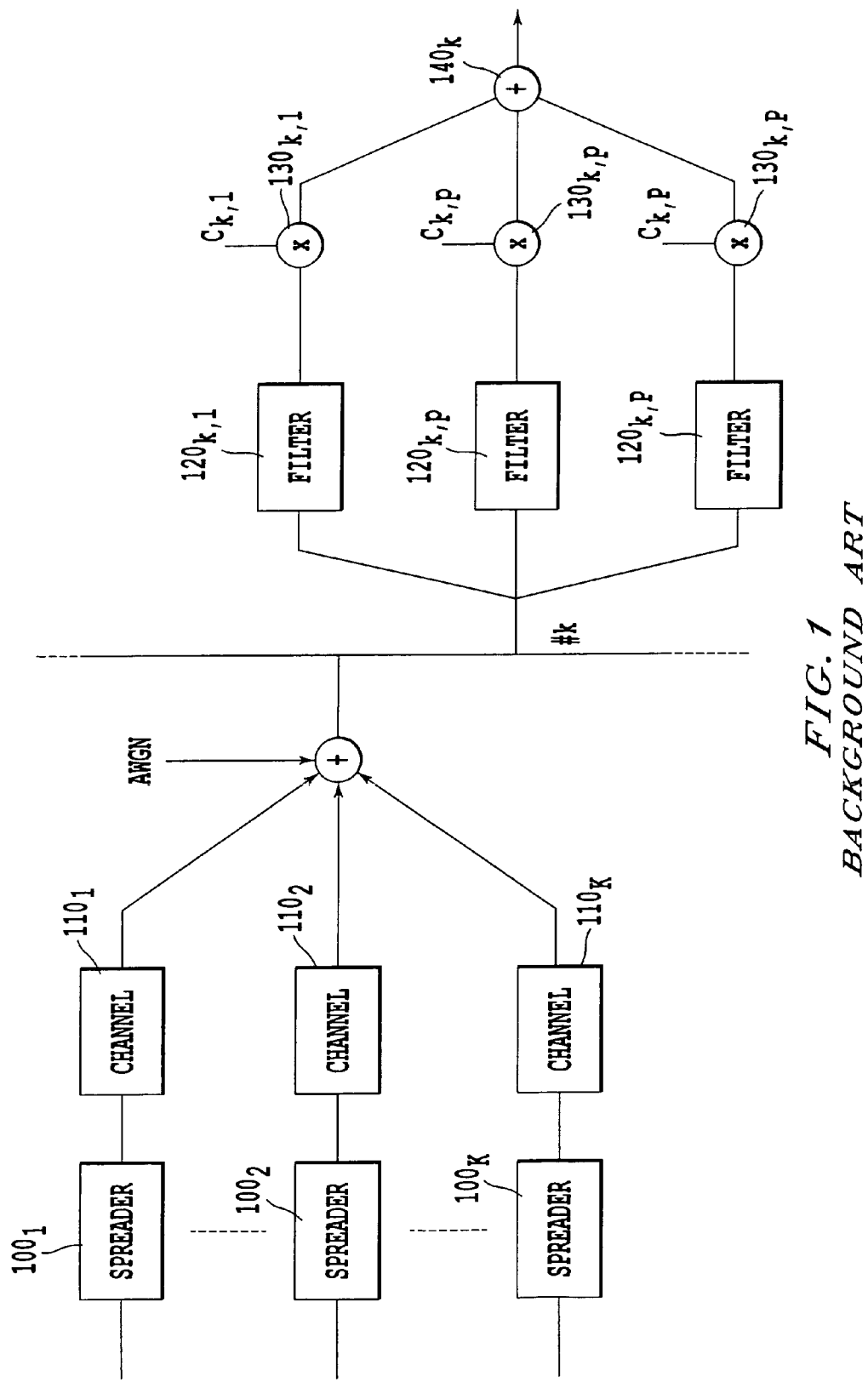
FIG. 1 depicts schematically a DS-CDMA telecommunications system.
Figure 2:
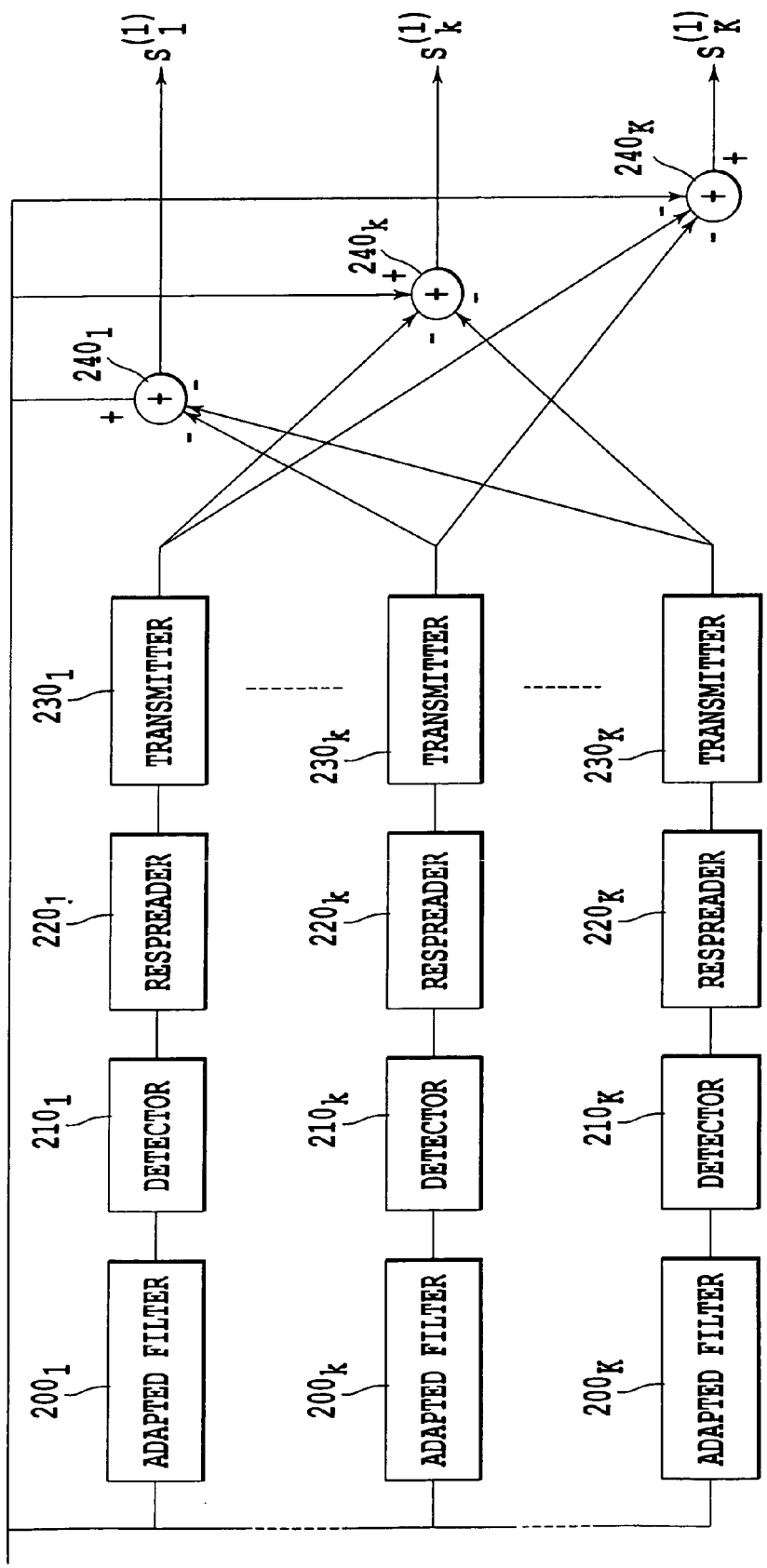
FIG. 2 depicts schematically a multi-user detection device of the PIC type.
Figure 3:
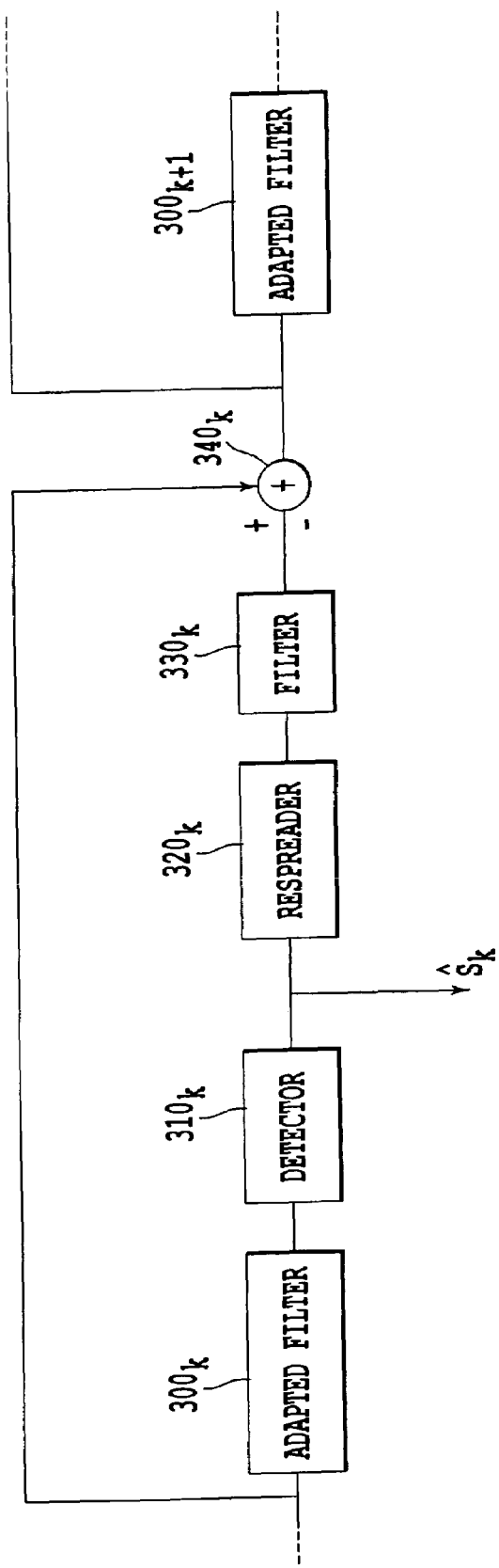
FIG. 3 depicts schematically a multi-user detection device of the SIC type.
Figure 4:
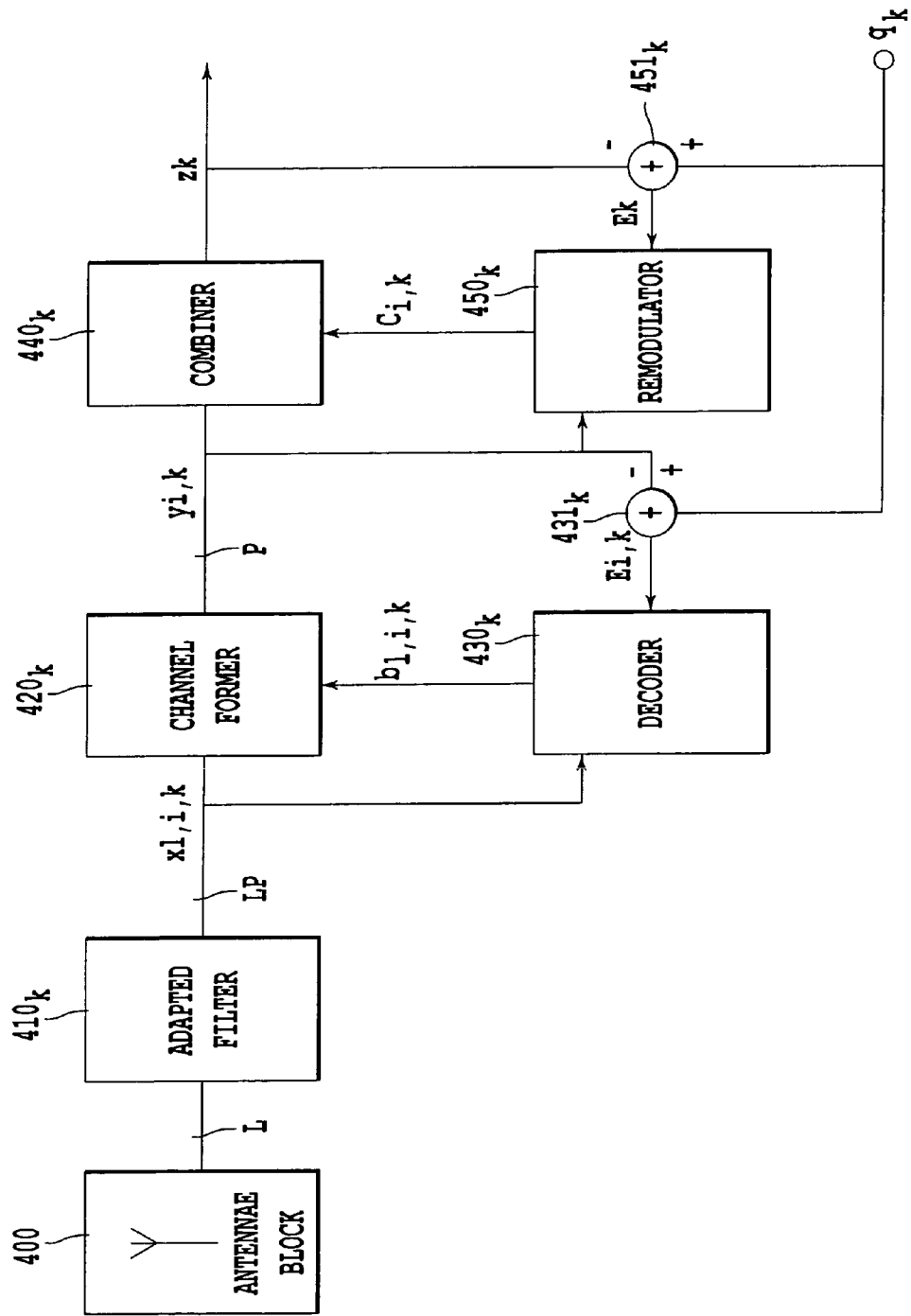
FIG. 4 depicts a first receiver of the rake type useful to the device according to the invention.

According to a first variant, the invention uses a receiver of the rake type as illustrated in FIG. 4.

The receiver depicted is dedicated to the reception of symbols transmitted by a user k. The system has L antennae represented schematically by the block (400). Each of the L antenna signals is then correlated by a battery of P adapted filters, where P is the number of propagation paths of the channel, each filter being adapted to a given path i. The set of L.P adapted filters is represented diagrammatically by the block (410$_k$).

If the notation $x_{l,i,k}$ is given to the contribution received by the antenna l, l=1, ..., L attributable to a path i, i=1 ... P of the channel k, k=1 ... K it is possible to write:

$$x_{l,i,k}(t) = \alpha_{l,i,k}(t) \cdot e^{j\xi_{l,i,k}} \cdot s_k(t) + n_{l,i,k}(t) \quad (1)$$

with $$\xi_{l,i,k}(t) = v_{i,k}(t) + (l-1) \cdot \varphi_{i,k}(t) = v_{i,k}(t) + 2\pi \frac{d}{\lambda}(l-1)\cos(\theta_{i,k}(t)) \quad (2)$$

where $s_k(t)$ is the symbol sent by the user k, $n_{l,i,k}(t)$ is the assumed white additive Gaussian noise at the antenna l for the path i of the user k, including the thermal noise, the multipath interference and the multi-user interference, d is the pitch of the array and λ is the wavelength.

The propagation along the path i of a signal sent by the user k can thus be modelled by an attenuation coefficient $\alpha_{i,k}(t)$ and a phase rotation $v_{i,k}(t)$. The total phase shift $\xi_{i,k}(t)$ results on the one hand from the phase rotation $v_{i,k}(t)$ induced on the path i and on the other hand the difference in operation between the antenna l and the reference antenna 1 at the angle of arrival $\theta_{i,k}(t)$.

The L.P adapted filters supply the signals $x_{l,i,k}$, l=1 ... L, i=1 ... P, the signals issuing from the filters adapted to the same path i being directed to a channel former associated with this path. The P channel formers are depicted in the form of a single block (420$_k$). The output signals from the channel formers, $y_{i,k}$, are written:

$$y_{i,k} = \sum_{l=1}^{L} x_{l,i,k} \cdot b_{l,i,k} \quad (3)$$

where $b_{l,i,k}$ are complex weighting coefficients. Operation (3) can also be written in an equivalent manner in the following vector form:

$$y_{i,k}(t) = \overline{b}_{i,k}(t)^T \cdot \overline{x}_{i,k}(t) = (b_{1,i,k}(t) b_{2,i,k}(t) \cdots b_{L,i,k}(t)) \cdot \begin{pmatrix} x_{1,i,k}(t) \\ x_{2,i,k}(t) \\ \vdots \\ x_{L,i,k}(t) \end{pmatrix} \quad (3')$$

where $b_{l,i,k}(t) = \alpha_{l,i,k} \cdot \exp(-j\psi_{l,i,k})$ with l=(1, ..., L)

Secondly, the output signals $y_{i,k}$, that is to say the different paths of the signal from the user k, are combined by the module (440$_k$) in order to supply a combination signal $z_k$. The combination signal $z_k$ can then be written:

$$z_k(t) = \overline{c}_k(t)^T \cdot \overline{y}_k(t) = (c_{1,k}(t) c_{2,k}(t) \cdots c_{P,k}(t)) \cdot \begin{pmatrix} y_{1,k}(t) \\ y_{2,k}(t) \\ \vdots \\ y_{P,k}(t) \end{pmatrix} \quad (4)$$

where $c_{i,k}(t) = \rho_{i,k} \cdot \exp(-\zeta_{i,k})$ with i=(1, ..., P) are complex weighting coefficients.

The coefficients $b_{l,i,k}$ are adapted so as to minimise, in root mean square value, the error signals expressed by:

$$\epsilon'_{i,k}(t) = q'_{i,k}(t) - y_{i,k}(t) \quad (5)$$

Likewise, the coefficients $c_{i,k}$ are adapted so as to minimise, in root mean square value, the error signals expressed by:

$$\epsilon''_k(t) = q''_k(t) - z_k(t) \quad (6)$$

where $q'_{i,k}(t)$ and $q''_k(t)$ are reference values corresponding to the observations output from (420$_k$) and (440$_k$) respectively. The reference values $q'_{i,k}(t)$ and $q''_k(t)$ are chosen so as to be equal:

$q'_{i,k}(t) = q''_k(t) = q_k(t)$ where $q_k(t)$ is a common reference value which does not depend on the path i.

In order to adapt the coefficients $b_{l,i,k}$ and $c_{i,k}$, it is possible to use, as a common reference value $q_k(t)$, either directly pilot symbols $p_k(t)$, or estimated symbols, before or after channel decoding, as will be seen below. Two possibilities of reference values can also follow each other, the adaptation of the coefficients $b_{l,i,k}$ and $c_{i,k}$ then starting with pilot symbols and continuing with estimated symbols.

Whatever the case, during the adaptation, the coefficients are modified so as to minimise the mean values $E(|\epsilon'_{i,k}|^2)$ and $E(|\epsilon''_k|^2)$. Because of the feedback of the error signal $\epsilon'_{i,k}$, the values $\psi_{l,i,k}$ converge progressively towards the values $v_{i,k} + (l-1)\phi_{i,k}$ and consequently compensate for the phase differences due to the channel and to the differences in operation between antennae. As a result the channel formers are not content to form beams in the direction of the different paths but also at least partially compensate for the phase rotations caused by the different paths. Such a type of channel former will be referred to hereinafter as a "channel former with phase precompensation". The module ($440_k$) then effects a combination on the signals of paths precompensated in phase issuing from the channel formers and corrects the phase shift remainders.

The coefficient adaptation algorithm is based on a minimisation, in root mean square value, of an error signal. Many algorithms have been proposed for this purpose in the literature and a description of the main ones can be found in the journal article by L. C. Godara entitled "Application of antenna arrays to mobile communications, Part II: Beamforming and direction-of-arrival considerations", published in Proceedings of the IEEE, Vol. 85, N° 8, August 1997, pages 1195–1245.

For example, it is possible to use an algorithm of the LMS (Least Mean Square) type or an algorithm of the RLS (Recursive Least Square) type as disclosed in the French application entitled "Bi-modular adaptive CDMA receiver" filed in the name of the applicant.

The receiver described above will be referred to hereinafter as a "receiver of the first type".

Figure 5:
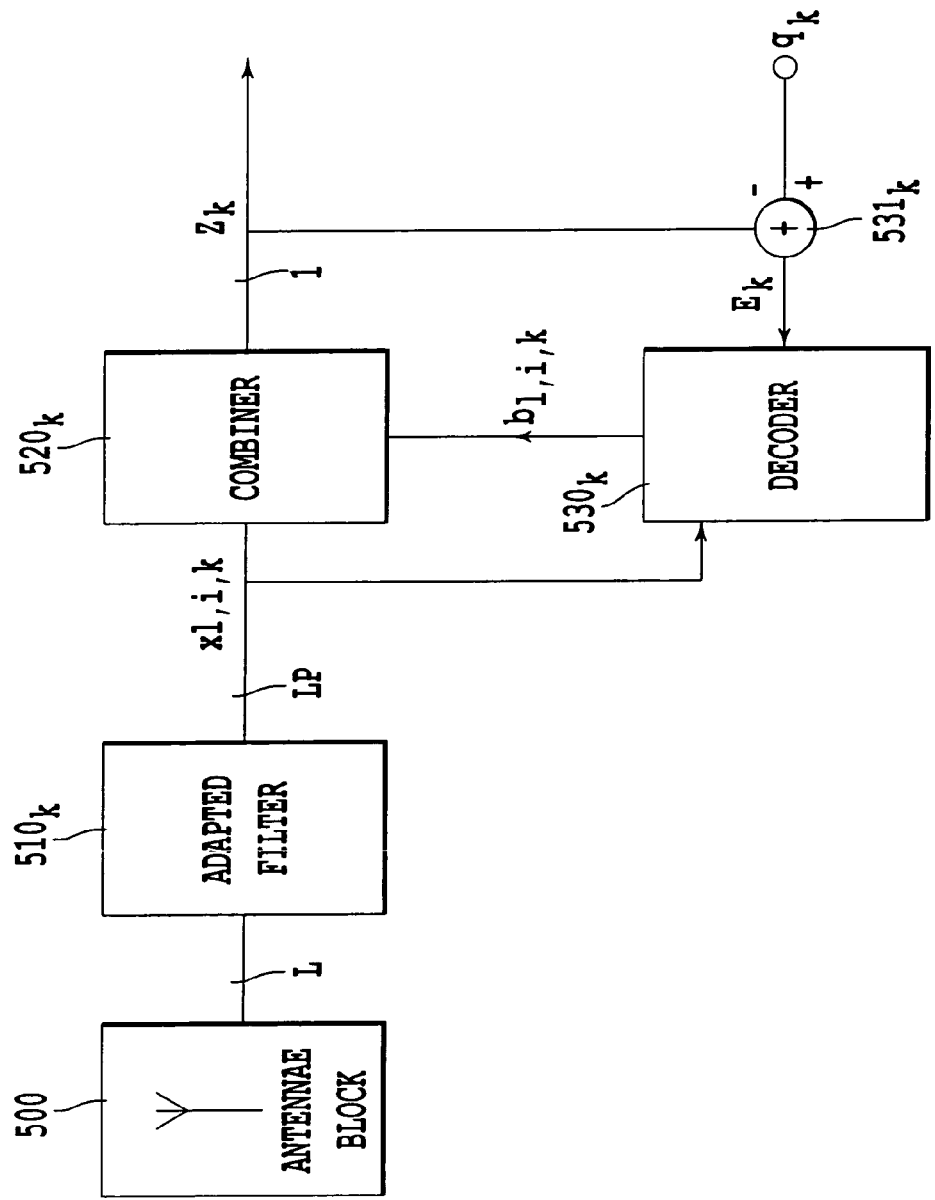
FIG. 5 depicts a second receiver of the rake type useful to the device according to the invention.

According to a second variant, the invention uses a receiver of the rake type as illustrated in FIG. 5.

The receiver depicted is dedicated to the reception of symbols transmitted over a channel k. The system includes L antennae represented schematically by the block (500). Each of the L antenna signals is then correlated by a battery of P adapted filters where P is the number of propagation paths of the channel, each filter being adapted to a path i. The set of L.P adapted filters is represented schematically by the block (510$_k$), the L.P output signals, $x_{l,i,k}$, l=1 ... L, i=1 ... P of the adapted filters being transmitted to a module linearly combining these output signals by means of complex coefficients $b_{l,i,k}$ represented by the block (520$_k$) in order to supply a combination signal $z_k$. The combination module (520$_k$) performs the following operations:

$$z_k = \sum_{i=1}^{P} \sum_{l=1}^{L} x_{l,i,k} \cdot b_{l,i,k} \quad (7)$$

where the values $b_{l,i,k}(t) = \alpha_{l,i,k} \cdot \exp(-j\psi_{l,i,k})$ with l=1, ..., L, i=1 ... P, are complex weighting coefficients. Equation (4) is written in an equivalent manner:

$$z_k(t) = \overline{b}_k(t)^T \cdot \overline{x}_k(t) \quad (7')$$

$$= (b_{1,i,k}(t) b_{2,i,k}(t) \cdots b_{L,i,k}(t) \cdots b_{1,P,k}(t) b_{2,P,k}(t) \cdots b_{L,P,k}(t)) \cdot$$

-continued $$\begin{pmatrix} x_{1,1,k}(t) \\ x_{2,1,k}(t) \\ \vdots \\ x_{L,1,k}(t) \\ x_{1,P,k}(t) \\ x_{L,P,k}(t) \end{pmatrix}$$

The coefficients $b_{l,i,k}$ are adapted so as to minimise, in root mean square value, the error signal expressed by:

$$\epsilon_k(t) = q_k(t) - z_k(t) \quad (8)$$

where $q_k(t)$ is a reference value corresponding to the observed signal $z_k(t)$.

In order to adapt the coefficients $b_{l,i,k}$ it is possible to use, as the reference value, either directly pilot symbols $p_k(t)$, or estimated symbols, before or after channel decoding, as will be seen below. The two possibilities of reference values can also follow each other, the adaptation of the coefficients $b_{l,i,k}$ then starting with the pilot symbols and continuing with estimated symbols.

During the adaptation, the coefficients $b_{l,i,k}$ are modified so as to minimise the mean value $E(|\epsilon_k|^2)$. Because of the feedback of the error signal $\epsilon_k$, the values $\psi_{l,i,k}$ converge progressively towards the values $v_{i,k} + (l-1)\phi_{i,k}$ and consequently compensate for the phase differences due to the channel and to the differences in operation between antennae. As a result the module (520$_k$) effects both a channel formation and a compensation for the phase rotations caused by the different paths. In addition, the module (520$_k$) effects a real weighting of the contributions of the different paths of each user.

The adaptation algorithm can, there too, be an algorithm of the LMS (Least Mean Square) type or an algorithm of the RLS (Recursive Least Square) type as disclosed in the French application entitled "Single-module adaptive CDMA receiver" filed in the name of the applicant.

The receiver described above will be designed hereinafter as a "receiver of the second type".

Figure 6A:
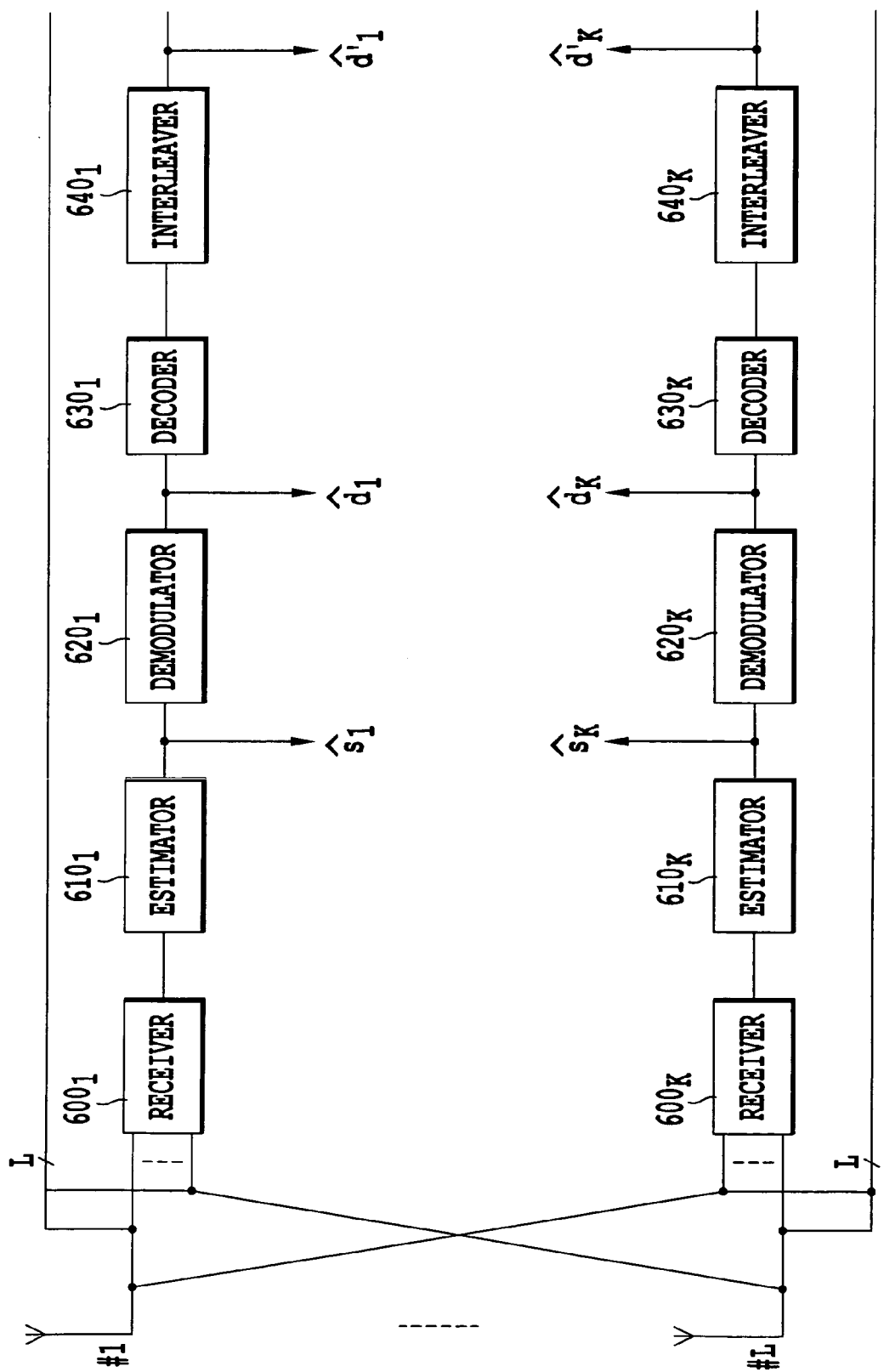
FIG. 6 depicts a multi-user detection device according to a first embodiment of the invention.
Figure 6B:
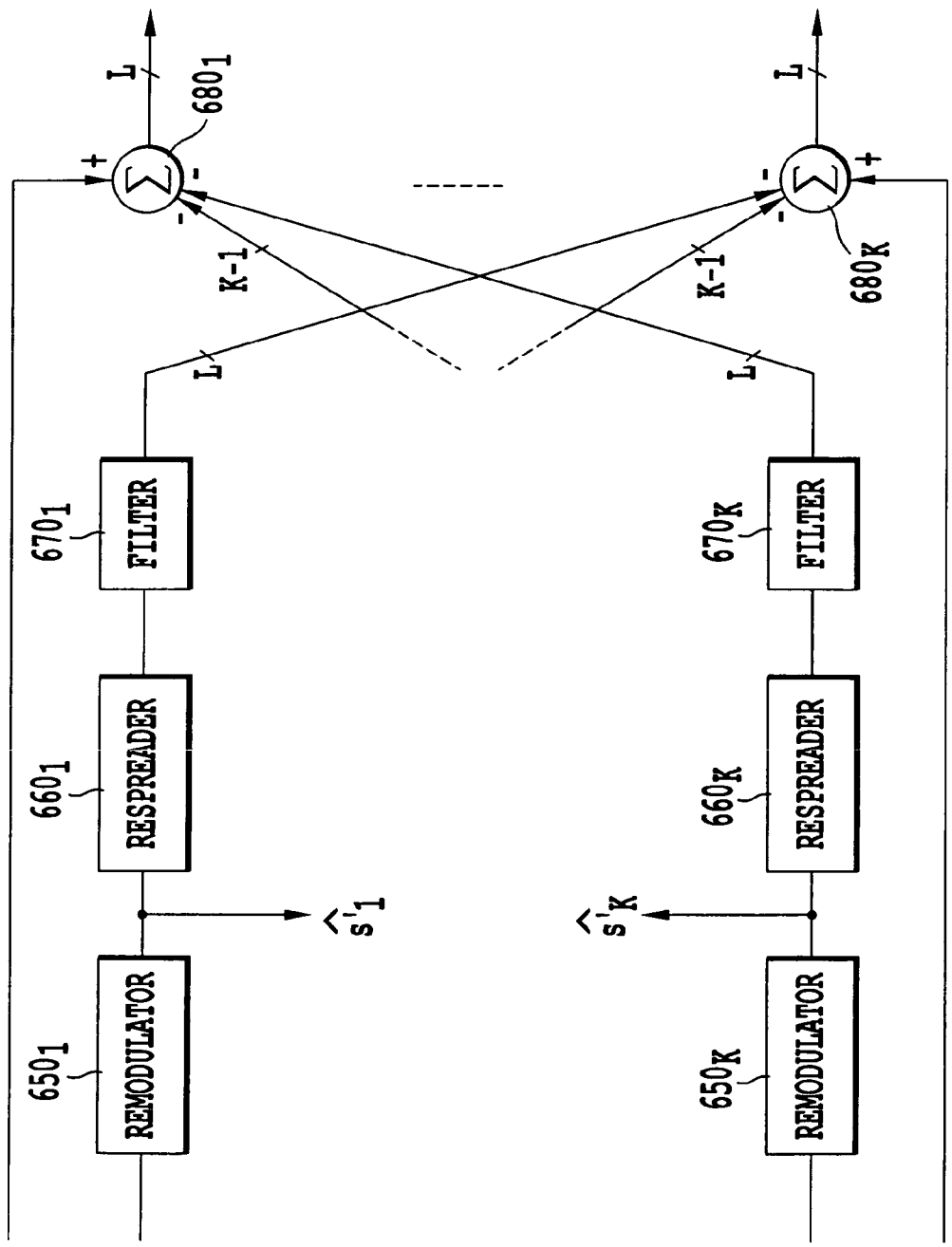

FIG. 6 depicts a multi-user detection device according to a first example embodiment of the invention. The multi-user interference is eliminated therein according to a parallel mode.

The outputs of the antennae 1 ... L in the array are all connected to a battery of receivers ($600_1$, ..., $600_K$) of the first type or second type, as illustrated respectively in FIGS. 4 and 5. The signals obtained at the output of these receivers are then subjected to a sequence of processing steps. This sequence comprises first of all a decision step ($610_1$, ..., $610_K$) supplying in soft or hard form an estimation of the symbols transmitted by the different users, that is to say $\hat{s}_k(t)$. If the decisions on the symbols taken at ($610_k$) have soft values, the estimated symbols $\hat{s}_k(t)$ are expressed as a weighting of the symbols of the constellation by their respective a posteriori probabilities. If the decisions on the symbols taken at ($610_k$) have hard values, the estimated symbols $\hat{s}_k(t)$ result from a thresholding of the observed signal $z_k(t)$ followed, possibly, by a weighting by a factor determined a priori. The estimated symbols are then demodulated ($620_1$, ..., $620_K$) in order to supply estimated data $\hat{d}_k(t)$. The estimated data are subjected to a step of deinterleaving and channel decoding ($630_1$, ..., $630_K$) and then recoded and interleaved once again ($640_1$, ..., $640_K$) in order to supply a more reliable estimation of the coded data. Advantageously, the decoding operation is performed by means of a decoding with soft inputs and outputs (SISO, standing for Soft Input Soft Output). It should be noted that recoding is not necessary if the encoded data are recovered directly at the decoding output. For example, if use is made at ($630_1, \ldots, 630_K$) of an algorithm of the SOVA (Soft Output Viterbi Algorithm) type the coded data can be recovered directly along the maximum likelihood path. The newly estimated data $\hat{d}'_k(t)$ are remodulated ($650_k$) and the symbols obtained $\hat{s}'_k(t)$, are respread spectrally ($660_k$) by the signal of the user k. Naturally, if the decoding used is of the soft value type, remodulation is also "soft" in the sense that it supplies symbols resulting from the weighting of symbols of the constellation, weighted by their respective a posteriori probabilities. Each respread symbol $\tilde{s}_k(t)$ is then filtered by filter ($670_k$) whose function will be explained below, whose role is to model the effect of the transmission channel k and the differences in operation between antennae. There is thus, at the output of the filter ($670_k$), an estimation of the "contribution" of the user k to the L antenna signals, the said contribution being in the form of an L-tuplet of signals $(\mathbf{x}_{l,k})_{l=1\ldots L}$.

There is deducted at ($680_k$), for each user k, from the L-tuplet of signals ($\mathbf{x}_l$) received by the L antennae, the L-tuplet $$\left(\sum_{k' \neq k} x_{l,k'}\right)$$

in order to eliminate the contribution due to the other users. In this way K L-tuplets of antenna signals are obtained, with the multi-user interference partly removed. The elimination process can be iterated by repeating the sequence ($600_k$) $\ldots$ ($670_k$) as from these signals and deducting, at each end of an iteration, from the signals ($\mathbf{x}_l$) received by the antennae, the newly calculated contributions. Each sequence of a user of the second iteration and the following iterations operates on a set (L-tuplet) of antennae where the contributions of the other users were eliminated at the previous iteration. The estimation of the symbols transmitted by the different users thus gains in reliability as the iterations progress.

It should be noted that the demodulation, deinterleaving, channel decoding/coding, interleaving and remodulation operations are optional (the blocks $620_k, 630_k, 640_k, 650_k$ are then absent). The spectral respreading can be applied directly to the estimated symbol $\hat{s}_k(t)$. However, the use of a channel decoding (with of course corresponding channel coding on sending) reduces the error rate and therefore improves the reliability of the estimation of the interference and, consequently, the reliability of the transmitted symbols.

The structure of the filter ($670_k$) depends on the type of receiver used at ($600_k$). The two types of receiver envisaged will be examined successively:

If the filter ($600_k$) is of the first type, the filter ($670_k$) performs the following operation:

$$x_{l,k}(t) = \sum_{i=1}^{P} w_{l,i,k}(t) \cdot u_{i,k}(t) \cdot \tilde{s}'(t - \hat{\tau}_{i,k}) \quad (9)$$

where the $\hat{\tau}_{i,k}$ values are the estimated delay times of the different paths i of the channel k obtained from the time differences between the correlation peaks calculated at ($410_k$);

$u_{l,i,k}$ are complex weighting coefficients modelling the "apparent" channel, that is to say where the different paths have been precompensated in phase, seen by the path recombination module ($440_k$);

$w_{l,i,k}$ are complex weighting coefficients modelling the differences in operation between antennae and the phase precompensation of the module ($420_k$).

According to a first variant embodiment of the invention, the coefficients $_{i,k}$ are chosen such that $u_{i,k}=c_{i,k}^*$, in a similar manner to the MRC algorithm applied to the path recombination. Thus multiplicative terms of the channel corresponding to the attenuations and the phase difference remainders applied in ($440_k$) are reconstructed.

According to a second embodiment, it is considered that the phase difference remainders are negligible and therefore that the coefficients $c_{i,k}$ are essentially real.

There is then chosen:

$$u_{i,k}=|c_{i,k}| \text{ or } u_{i,k}=c_{i,k} \text{ or } u_{i,k}=\text{Re}[c_{i,k}] \quad (10)$$

where Re[.] represents the real part.

In the same way, the coefficients $b_{l,i,k}$ are considered to be pure phase differences. The terms $w_{l,i,k}$ can then be chosen so as to reconstruct the phase differences corresponding to the coefficients $b_{l,i,k}$ applied in ($420_k$).

According to a first variant embodiment, there is then chosen:

According to a second variant of the invention, a linear regression is effected on the values $\psi_{l,i,k}$ as described in French application FR-A-0011160 filed on 29 Aug. 2000 in the name of the applicant and incorporated here by reference. More precisely, for a given path i, the values $\hat{v}_{i,k}$ and $\hat{\phi}_{i,k}$ which minimise the mean square deviation J are sought:

$$J(\hat{v}_{i,k}, \hat{\phi}_{i,k}) = \sum_{l=1}^{L} (\hat{v}_{i,k} + (l-1) \cdot \hat{\phi}_{i,k} - \psi_{l,i,k})^2 \quad (12)$$

These two values are obtained by cancellation of the partial derivatives of the function J, and there is then obtained:

$$\hat{v}_{i,k} = \overline{\psi}_{i,k} - \hat{\phi}_{i,k} \cdot (\overline{l-1}) \quad (13)$$

$$\text{with } \overline{\psi}_{i,k} = \frac{1}{L}\sum_{l=1}^{L} \psi_{l,i,k} \text{ and } \overline{l-1} = \frac{1}{L}\sum_{l=1}^{L}(l-1)$$

and $$\hat{\phi}_{i,k} = \frac{\overline{(l-1) \cdot \psi_{l,i,k}} - \overline{\psi}_{l,i,k}\overline{l-1}}{\overline{(l-1)^2} - \overline{l-1}^2} \quad (14)$$

where $\overline{X}$ designates the average of X over the L antennae. By means of equation (13), it is then possible to calculate $\hat{v}_{i,k}$. From the values $\hat{v}_{i,k}$ and $\hat{\phi}_{i,k}$ there is then chosen:

$$w_{l,i,k}=\exp(j(\hat{v}_{i,k}+(l-1).\hat{\phi}_{i,k})) \quad (15)$$

which gives a less noisy estimation than the one supplied by equation (11).

If now the filter ($600_k$) is of the second type, the filter ($670_k$) performs the following operations:

$$x_{l,k}(t) = \sum_{i=1}^{P} w_{l,i,k}(t) \cdot u_{i,k} \cdot (t) \cdot \check{s}'(t - \hat{\tau}_{i,k}) \qquad (16)$$

The coefficients $u_{i,k}$ are obtained by considering that the energy of the radiation diagram of the channel former relating to a path is proportional to the attenuation undergone by the signal along this path. If there is noted:

$$\overline{b}_{i,k} = \begin{pmatrix} b_{1,i,k} \\ b_{2,i,k} \\ \vdots \\ b_{L,i,k} \end{pmatrix}, g_{i,k} = \|\overline{b}_{i,k}\| \text{ and } g_k = \sqrt{\frac{1}{P}\sum_{i=1}^{P} g_{i,k}^2}$$

there is then chosen $$u_{i,k} = g_{i,k}/g_k \qquad (17)$$

The norm $g_{i,k}$ can, for example, be approximated by $g_{i,k} = \max_l |b_{l,i,k}|$ or by $$g_{i,k} = \overline{b}_{l,i,k} = 1/L \cdot \sum_{l=1}^{L} b_{l,i,k}.$$

The coefficients $w_{l,i,k}$ are obtained, for their part, as before by equation (11): $w_{l,i,k} = \exp(j\psi_{l,i,k})$ where $\psi_{l,i,k} = \text{Arctan}(\text{Im}[b_{l,i,k}]/\text{Re}[b_{l,i,k}])$ with possibly elimination of the phase noise by linear regression, as indicated by equations (12) to (15).

When a filter of the first or second type is used, the coefficients $b_{l,i,k}$ and, where applicable, $c_{i,k}$, must be initialised at each iteration.

For the first iteration, the coefficients will be initialised by the values:

for a receiver of the first type:

$$b_{l,i,k}(0) = \delta(l-l_0), \forall i \text{ and } c_{i,k}(0) = c, \forall i \qquad (18)$$

where $\delta$ is the Dirac symbol, $l_0$ is an antenna number and c a given complex coefficient;

for a receiver of the second type:

$$b_{l,i,k}(0) = b.\delta(l-l_0), \forall i \qquad (19)$$

where $\delta$ is the Dirac symbol, $l_0$ is an antenna number and b a given complex coefficient.

In both cases, the initial configuration chosen is a multipath omni-directional configuration.

Alternatively, if there is an initial estimation of the attenuation coefficients, directions of arrival and phase rotations of the different paths, it is possible to initialise the coefficients, at the first iteration, by the values:

for a receiver of the first type:

$$b_{l,i,k}(0) = \exp(-j(\hat{v}_{i,k}(0) + 2\pi d/\lambda.\cos\hat{\theta}_{i,k}(0).(i\,l-1))) \text{ and } c_{i,k}(0) = \hat{\alpha}_{i,k}(0) \qquad (20)$$

for a receiver of the second type:

$$b_{l,i,k}(0) = \hat{\alpha}_{i,k}(0).\exp(-j(\hat{v}_{i,k}(0) + 2\pi d/\lambda.\cos\hat{\theta}_{i,k}(0).(l-1))) \qquad (21)$$

where $\hat{\theta}_{i,k}(0)$, $\hat{v}_{i,k}(0)$, $\hat{\alpha}_{i,k}(0)$ are respectively the initial estimations of the directions of arrival, phase rotations and coefficients of attenuation for the different paths.

At the second iteration and at the subsequent iterations the coefficients $b_{l,i,k}$ and, where applicable, $c_{i,k}$ are initialised by the values of the coefficients obtained at the end of adaptation at the previous iteration. More precisely, if it is agreed to initialise the time to zero at the start of each new iteration and if the length of the block of symbols processed by an iteration is denoted T, there is chosen:

$$b^{(n)}_{l,i,k}(0) = b^{(n-1)}_{l,i,k}(T) \qquad (22)$$

where the index n indicates the number of the iteration.

If the adaptation process has not converged at the previous iteration, that is to say, for example, if the modules of the error signal or signals are greater than a predetermined threshold during this iteration, it may be preferred to reinitialise the said coefficients to values given by (18), (19) or (20), (21). It will also be possible to use as initial values a mean, possibly weighted by a forgetting factor $\delta$, of the final valuations of the previous iterations, that is to say:

$$b^{(n)}_{l,i,k}(0) = \sum_{m=1}^{M} \delta^m b^{(n-m)}_{l,i,k}(T) \qquad (23)$$

After the phase of initialising the coefficients, it is important to specify what reference values $q_k(t)$ are used by the receivers ($600_k$): it is possible to use pilot symbols or symbols $\hat{s}_k$ obtained after soft or hard decision at the output of ($610_k$) or symbols obtained after channel decoding/recoding at the output of ($650_k$). In order not to delay the feedback of the error signal by waiting for operations ($610_k$) to ($650_k$), the values of the symbols obtained at the previous iteration will advantageously be used, that is to say:

$$q^{(n)}_k(t) = \hat{s}'^{(n-1)}_k(t) \qquad (24)$$

where $q^{(n)}_k(t)$ designates the reference value used at time t of iteration n.

It can also be envisaged taking as the reference value a weighted mean between a symbol output from ($610_k$) of the current iteration and a corresponding symbol output from ($650_k$) of the previous iteration, that is to say:

$$q^{(n)}_k(t) = \eta.\hat{s}'^{(n-1)}_k(t) + (1-\eta).\hat{s}^{(n)}_k(t) \text{ where } \eta \text{ is a weighting coefficient } (0 \leq \eta \leq 1).$$

Figure 7:
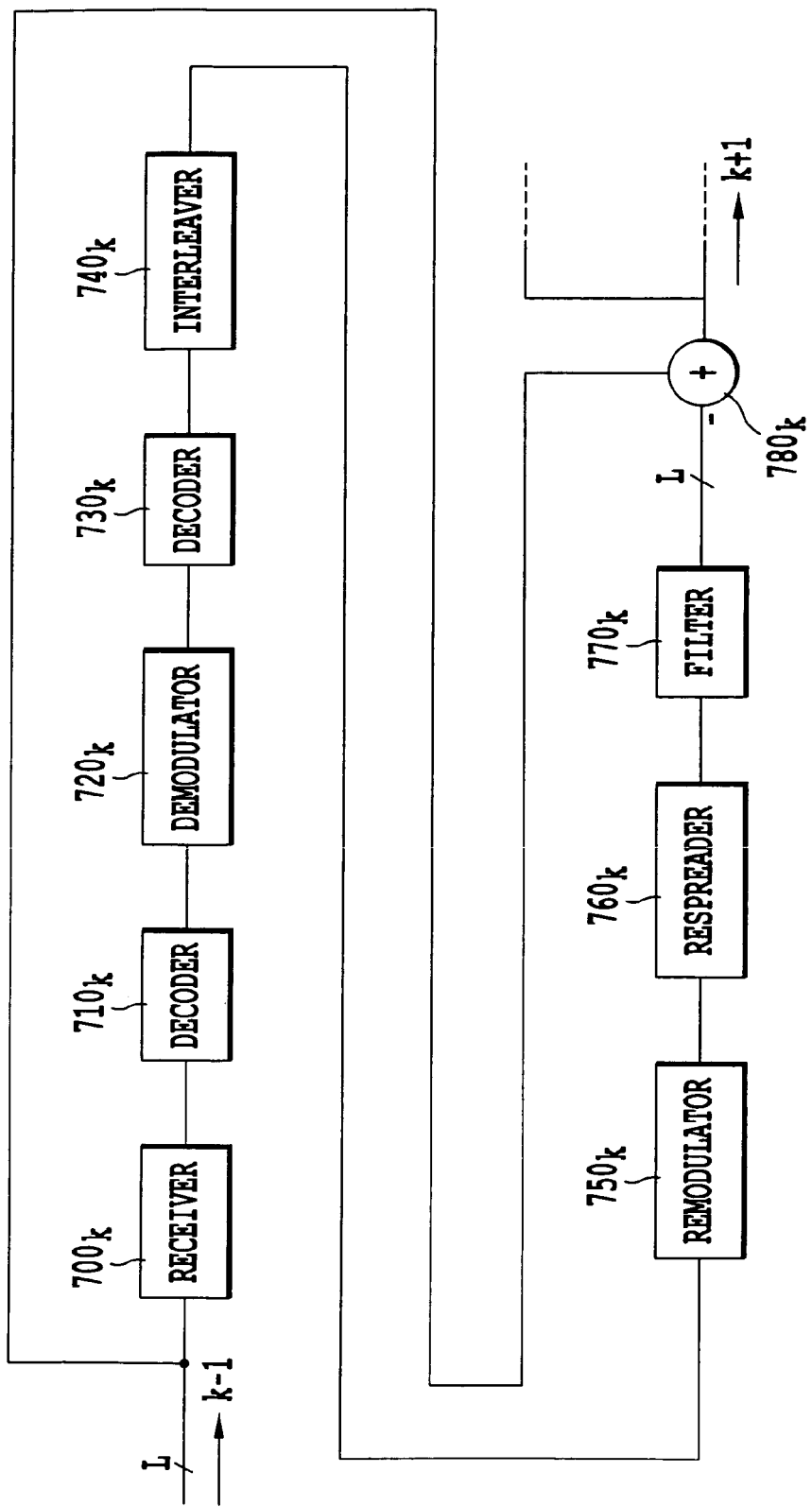
FIG. 7 depicts a multi-user detection device according to a second embodiment of the invention.

FIG. 7 illustrates a multi-user detection device according to a second example embodiment of the invention.

Unlike FIG. 6, the elimination of the interference is performed here in a series of K steps, K being the number of users. The contributions of the different users to the signals received are ordered in decreasing order of power. For each user, the squared moduli of the outputs of the filters adapted to the user connected to the different antennae will for example be summered and the sums obtained will be compared.

In order to simplify the diagram a single stage has been depicted, each stage performing one elimination step. Each stage has at its input a receiver ($700_k$) of the first type or of the second type, as illustrated respectively in FIGS. 4 and 5. The receiver of the first stage receives the L antenna signals and the receiver of a subsequent stage receives the L output signals from the previous stage. At the output of the receiver, as already described for FIG. 6, a soft or hard decision is made on the symbols ($710_k$) with a demodulation ($720_k$), a deinterleaving and a channel decoding ($730_k$), a channel recoding and interleaving (740$_k$), a remodulation (750$_k$) and a respreading (760$_k$) of the symbols and then a reconstruction filtering (770$_k$). The filters (770$_k$) are identical to the filters (670$_k$) already described. The L signals output from (770$_k$) are then subtracted at (780$_k$) from the L input signals of the stage k in order to supply the L input signals of the stage k+1. Thus the contribution of the different users are successively eliminated, commencing with those which create the greatest interference. The outputs of the reconstruction filters (770$_k$) of the different stages 1 . . . K can be used, like those of the reconstruction filters (670$_k$) of FIG. 6, in order to regenerate, for each user k, its contribution to the antenna signals, in the form of an L-tuplet ($x_{l,k}$). The contributions of the different users are subtracted one by one by the adders (780$_k$) of the different stages.

The comments made here concerning the initialisation of the coefficients for the first iteration apply here for the sequences of the different users. In other words, at each sequence of a user the coefficients are initialised by (18) or (20) if the receiver used is of the first type and by (19) or (21) if the receiver used is of the second type.

In addition, it can be envisaged causing a serial elimination phase (FIG. 7) to be followed by a parallel elimination phase (FIG. 6). More generally, the channels can be grouped together in "packets" corresponding to users of the same spatial region or adjacent powers, the interference between packets can be dealt with first of all, and then the interference between users of the same packet next. The inter-packet treatment can be of a type (serial or parallel) different from the intra-packet treatment.

Figure 8B:
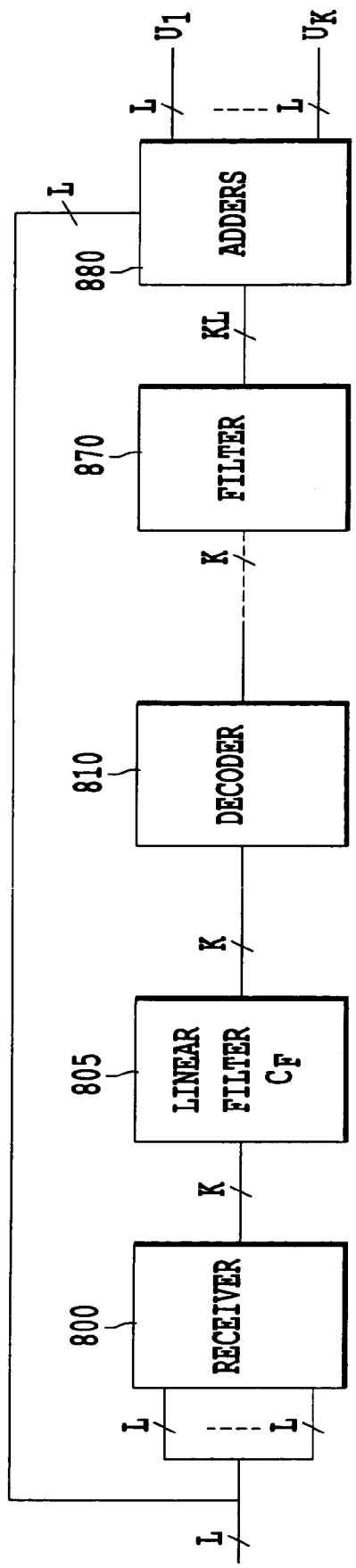
FIG. 8b depicts in an equivalent fashion a multi-user detection device according to the third embodiment of the invention.

FIG. 8$a$ depicts a multi-user detection device according to a fourth embodiment of the invention.

This embodiment extends the parallel elimination mode in the sense that it now includes a "multi-equalisation" function which will be explained below. The reference numbers indicated are the translations of those of FIG. 6 when they correspond to identical fictions. The device depicted in FIG. 8$a$ nevertheless differs from the one in FIG. 6 in that it comprises a linear filter (805) upstream of the decision modules (810$_k$). The purpose of this filtering is to take into account the outputs of the receivers of the first type or second type (800$_k$) at different sampling times in the elimination of the interference. The filter (805) is a transverse linear time filter which fulfils a role equivalent to that of a conventional transverse linear equaliser when a single user is considered. Unlike the latter, however, the filter (805) is a matrix filter which operates on size vectors K and therefore uses matrices of size K×K instead of scalar coefficients, the number of such matrices corresponding to the number of filter time slots. The diagonal coefficients of the different matrices allow equalisation proper whilst the coefficients outside the diagonals make it possible to take into account the time responses of the different channels in the rejection of the interference between users. Just like its single-user homologue the transverse filter (805) can be optimised by means of a known technique such as that of zero forcing (ZF) or minimum mean square error (MMSE).

FIG. 8$b$ depicts in an equivalent manner the device of FIG. 8$a$, showing the vector processing character of the different modules (800) to (880), each module respectively including the modules (800$_1$, . . . , 800$_K$), . . . (880$_1$, . . . , 880$_K$) of FIG. 8$a$ (for example, the module (800) is a battery of receivers of the first or second type). The matrix filter (805) of course remains unchanged.

Figure 9:
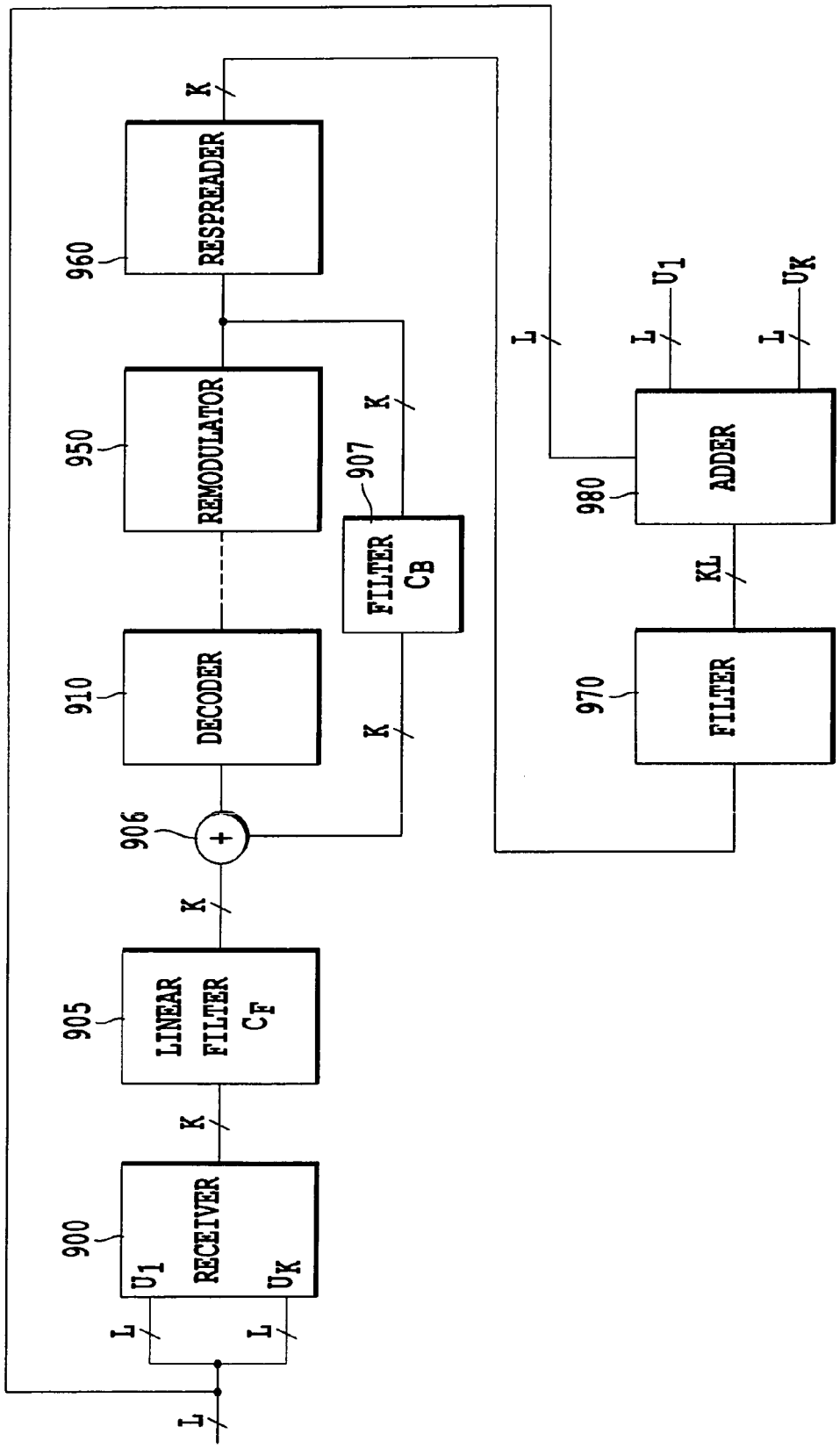
FIG. 9 depicts a multi-user detection device according to a fourth embodiment of the invention.

FIG. 9 depicts a multi-user detection device according to a fifth embodiment of the invention.

This embodiment transposes the technique of equalisation by decision feedback (DF) in the multi-user context. The modules (900), (910), . . . (980) are modules identical to the modules (800), (810), . . . , (880) of FIG. 8, each module operating, as stated, on a vector with K components. The device comprises a precursor transverse filter (905) identical to the filter (805) and a postcursor filter (907) filtering the vector of the symbols $\hat{s}'_k$ at the output of the module (950). The output of the postcursor filter is subtracted (906) at the input of the decision module (910). The assembly consisting of the transverse filter (905) and the feedback filter (907) can, there too, be optimised according to a known technique, ZF or MMSE for example.

The postcursor filter (907) must be causal so as to ensure that there is no need to subtract the contribution of time samples not yet available at the time of subtraction of the current sample. This may notably impose constraints on the length of the interleaving. Alternatively, the postcursor filter (907) will filter the symbol vector $\hat{s}_k$ at the output of the decision module (910) which will make it possible to relax the causality constraint, at the cost however of abandoning the benefit of channel decoding in the evaluation of the inter-symbol interference by the postcursor filter.

The embodiments illustrated in FIGS. 8$a$, $b$ and 9 both use a "multi-equalisation" derived from single-user equalisation symbol by symbol. It is however clear to a person skilled in the art that the invention can also be extended to the family of techniques of equalisation with estimation of symbol sequences, namely MLSE (Maximum Likelihood Sequence Estimation), DDFSE (Delayed Decision Feedback Sequence Estimation), RSSE (Reduced State Sequence Estimation) etc. All these techniques can also be transposed by means of the invention to the multi-user situation.

Although the invention has been essentially illustrated, for reasons of convenience, by means of modules executing certain functions, it is clear however that all or only some of these functions can be executed by a processor programmed for this purpose.

The invention claimed is:

1. Multi-user detection method with elimination of interference between users, each user transmitting modulated data in the form of symbols on a transmission channel, each transmission channel (k) comprising at least one propagation path (i) and each propagation path arriving at an array of reception antennae (l) according to a direction of arrival ($\theta_{i,k}$), the method comprising at least one sequence of steps for each transmission channel (k), wherein each sequence comprises:
   (a) a reception step decomposing each antenna signal into filtered signals ($x_{l,i,k}$) issuing from the different paths (i) of the transmission channel (k) and combining the filtered signals by scaling the filtered signals with a first plurality of complex coefficients ($b_{l,i,k}, c_{i,k}$) in order to form an estimation ($z_k$) of the signal transmitted by the user;
   (b) a step of estimating the contribution (($x_{l,k}$)l=1 . . . L), where L is an integer, of the user to the signals received by the array of reception antennae from the estimation of the signal transmitted and a second plurality of complex coefficients ($u_{l,k}, w_{l,i,k}$) obtained from the first plurality of complex coefficients;
   (c) a step of eliminating interference by subtracting from the antenna signals the contribution estimated at step (b) in order to obtain cleaned antenna signals;
   the cleaned antenna signals supplied by at least one first sequence being used as antenna signals by at least one second sequence.

2. Multi-user detection method according to claim 1, wherein the first plurality of complex coefficients comprises a first set of complex coefficients ($b_{l,i,k}$) and a second set of complex coefficients ($c_{i,k}$) and the filtered signals ($x_{l,i,k}$) are subjected to a channel formation step in order to form signals of paths ($y_{i,k}$) by scaling the path signals with the first set, the path signals then being linearly combined by scaling the path signals with the second set in order to supply the estimation ($z_k$) of the signal transmitted, the coefficients of the first set being adapted so as to minimise a plurality of first error signals ($\epsilon'_{i,k}$) between a reference value ($q_k$) of the transmitted signal and the path signals ($y_{i,k}$), the coefficients of the second set being adapted so as to minimise a second error signal ($\epsilon''_k$) between the estimation ($z_k$) and the reference value.

3. Multi-user detection method according to claim 2, wherein the second plurality ($w_{l,i,k}, u_{i,k}$) of coefficients comprises a first set of complex coefficients ($w_{l,i,k}$) and a second set of complex coefficients ($u_{i,k}$), the coefficients ($w_{l,i,k}$) of the first set of the second plurality being obtained from the arguments of the coefficients ($b_{l,i,k}$) of the first set of the first plurality and the coefficients ($u_{i,k}$) of the second set of the second plurality being obtained from coefficients ($c_{i,k}$) of the second set of the first plurality.

4. Multi-user detection method according to claim 3, wherein the coefficients ($u_{i,k}$) of the second set of the second plurality are obtained by conjugation of the coefficients ($c_{i,k}$) of the second set of the first plurality.

5. Multi-user detection method according to claim 3 or 4, wherein the coefficients ($w_{l,i,k}$) of the first set of the second plurality are obtained from a linear regression on the arguments of the coefficients ($b_{l,i,k}$) of the first set of the first plurality.

6. Multi-user detection method according to one of claims 2 to 4, wherein at the first sequence,
the coefficients ($b_{l,i,k}$) of the first set of the first plurality are initialised by $b_{l,i,k}(0)=\delta(l-l_o), \forall i$ where $\delta$ is the Dirac symbol, $l_o$ is an antenna number;
and the coefficients ($c_{i,k}$) of the second set of the first plurality are initialised by $c_{i,k}(0)=c, \forall i$ where c is a given complex coefficient.

7. Multi-user detection method according to one of claims 2 to 4, wherein at the first sequence,
the coefficients ($b_{l,i,k}$) of the first set of the first plurality are initialised by $b_{l,i,k}(0)=\exp(-j(\hat{v}_{i,k}(0)+2\pi d/\lambda.\cos\hat{\theta}_{i,k}(0).(l-1)))$ and the coefficients ($c_{i,k}$) of the second set of the first plurality are initialised by $c_{i,k}(0)=\hat{\alpha}_{i,k}(0)$ where $\hat{\theta}_{i,k}(0)$, $\hat{v}_{i,k}(0)$, $\hat{\alpha}_{i,k}(0)$ are respectively estimations of the directions of arrival, phase rotations and coefficients of attenuation for the different paths.

8. Multi-user detection method according to claim 1, wherein the first plurality of coefficients includes a set of complex coefficients ($b_{l,i,k}$) and the filtered signals ($x_{l,i,k}$) are linearly combined ($520_k$) by scaling the filtered signals with said set in order to supply said estimation ($z_k$) of the signal transmitted, the coefficients of said set being adapted so as to minimise an error signal ($\epsilon_k$) between the estimation ($z_k$) and a reference value ($q_k$).

9. Multi-user detection method according to claim 8, wherein said second plurality ($w_{l,i,k}, u_{i,k}$) of coefficients comprises a first set of complex coefficients ($w_{l,i,k}$) and a second set of complex coefficients ($u_{i,k}$), the coefficients ($u_{i,k}$) of the second set of the second plurality being obtained by: $u_{i,k}=g_{i,k}/g_k$ where $g_{i,k}$ is an estimation of the norm of the sub-vector $$\bar{b}_{i,k} = \begin{pmatrix} b_{1,i,k} \\ b_{2,i,k} \\ \vdots \\ b_{L,i,k} \end{pmatrix},$$

L being the number of antennae in the array, where $g_k$ is a mean of the $g_{i,k}$ values on the different paths, the coefficients ($w_{l,i,k}$) of the first set of the second plurality being obtained from the arguments of the coefficients ($b_{l,i,k}$) of the set of the first plurality.

10. Multi-user detection method according to claim 8 or 9, wherein at the first sequence, the coefficients ($b_{l,i,k}$) of the set of the first plurality are initialised by $b_{l,i,k}(0)=b.\delta(l-l_o)$, $\forall i$ where $\delta$ is the Dirac symbol, lo is an antenna number and b a given complex coefficient.

11. Multi-user detection method according to claim 8 or 9, wherein at the first sequence, the coefficients ($b_{l,i,k}$) of the set of the first plurality are initialized by $b_{l,i,k}(0)=\hat{\alpha}_{i,k}(0).\exp(-j(\hat{v}_{i,k}(0)+2\pi d/\lambda.\cos\hat{\theta}_{i,k}(0).(l-1)))$ where $\hat{\theta}_{i,k}(0)$, $\hat{v}_{i,k}(0)$, $\hat{\alpha}_{i,k}(0)$ are respectively estimations of the directions of arrival, phase rotations and coefficients of attenuation for the different paths.

12. Multi-user detection method according to one of the claims 1–4 and 8–9, wherein for a given transmission channel (k), the interference is eliminated by subtracting from the antenna signals of the contributions of all the other users.

13. Multi-user detection method according to claim 12, wherein each sequence comprises a step of estimating the symbols transmitted from the estimation of the signal transmitted ($z_k$) in order to obtain first estimated signals ($\hat{s}k$), a step of demodulating the first estimated symbols ($\hat{s}k$) in order to obtain estimated data ($dk$), a step of channel decoding of the estimated data followed by a channel recoding and a remodulation in order to obtain second estimated symbols ($\hat{s}'k$).

14. Multi-user detection method according to claim 2 or 8, wherein the reference value ($q^{(n)}_k$) for a transmitted signal, used at the second sequence or at a subsequence sequence (n), is the second estimated symbol ($\hat{s}'^{(n-1)}_k$) obtained for this signal at the previous sequence.

15. Multi-user detection method according to claim 2 or 8, wherein the reference value ($q^{(n)}_k$) for a transmitted signal, used at the second sequence or at a subsequent sequence (n), is a combination of the first estimated symbol ($\hat{s}^{(n)}_k$) obtained for this signal at the current sequence and of the second estimated symbol ($\hat{s}'^{(n-1)}_k$) obtained for this signal at the previous sequence.

16. Multi-user detection method according to one of claims 1–4 and 8–9, wherein at the second sequence and at the subsequent sequences, the coefficients of the first plurality of a sequence are initialised from the values of coefficients of the first plurality of the previous sequence.

17. Multi-user detection method according to one of claims 1–4 and 8–9, wherein the users are classified in order of received power and the interference is eliminated by subtracting, one after the other, the contributions of the different users, commencing with the users with the highest received powers.

18. Multi-user detection method according to claim 17, wherein for each sequence of a transmission channel (k), the coefficients ($b_{l,i,k}$) of the first set of the first plurality are initialised by $b_{l,i,k}(0)=\delta(l-lo), \forall i$ where $\delta$ is the Dirac symbol, lo is an antenna number;

and the coefficients ($c_{i,k}$) of the second set of the first plurality are initialised by $c_{i,k}(0)=c, \forall i$ where c is a given complex coefficient.

19. Multi-user detection method according to claim 17, wherein for each sequence of a transmission channel (k), the coefficients ($b_{l,i,k}$) of the first set of the first plurality are initialised by $b_{l,i,k}(0)=\exp(-j(\hat{v}_{i,k}(0)+2\pi d/\lambda.\cos\hat{\theta}_{i,k}(0).(l-1)))$ and the coefficients ($c_{i,k}$) of the second set of the first plurality are initialised by $c_{i,k}(0)=\hat{\alpha}_{i,k}(0)$ where $\hat{\theta}_{i,k}(0)$, $\hat{v}_{i,k}(0)$, $\hat{\alpha}_{i,k}(0)$ are respectively estimations of the directions of arrival, phase rotations and coefficients of attenuation for the different paths.

20. Multi-user detection method according to claim 17, wherein for each sequence of a transmission channel (k), the coefficients ($b_{l,i,k}$) of the set of the first plurality are initialised by $b_{l,i,k}(0)=b.\delta(l-lo), \forall i$ where $\delta$ is the Dirac symbol, lo is an antenna number and b a given complex coefficient.

21. Multi-user detection method according to claim 17, wherein for each sequence of a transmission channel (k), the coefficients ($b_{l,i,k}$) of the set of the first plurality are initialised by $b_{l,i,k}(0)=\hat{\alpha}_{i,k}(0).\exp(-j(\hat{v}_{i,k}(0)=2\pi d/\lambda.\cos\hat{\theta}_{i,k}(0).(l-1)))$ where $\hat{\theta}_{i,k}(0)$, $\hat{v}_{i,k}(0)$, $\hat{\alpha}_{i,k}(0)$ are respectively estimations of the directions of arrival, phase rotations and coefficients of attenuation for the different paths.

22. Multi-user detection method according to claim 12, wherein the estimations of the transmitted signals of the users being considered comprise an estimations vector with K components where K is the number of users, the vector is subjected to a transverse matrix filtering.

23. Multi-user detection method according to claim 22, wherein the estimated symbols of the users being considered comprise a symbols vector with K components, the symbols vector is subjected to a postcursor matrix filtering, and the output of this filtering is subtracted, vector by vector, from the output of the transverse matrix filtering.

24. A multi-user detection system for elimination of interference between users, each user transmitting modulated data in the form of symbols on a transmission channel, each transmission channel (k) comprising at least one propagation path (i) and each propagation path arriving at an array of reception antennae (l) according to a direction of arrival ($\theta_{i,k}$), the system comprising:

a receptor configured to decompose each antenna signal into filtered signals ($x_{l,i,k}$) issuing from the different paths (i) of the transmission channel (k) and combining the filtered signals by scaling the filtered signals with a first plurality of coefficients ($b_{l,i,k}, c_{i,k}$) in order to form an estimation ($z_k$) of the signal transmitted by the user;

an estimator configured to estimate the contribution (($x_{l,k}$)l=1 . . . L), where L is an integer, of the user to the signals received by the different antennae from the estimation of the signal transmitted and a second plurality of coefficients ($u_{i,k}, w_{l,i,k}$) obtained from the first plurality of coefficients;

said receptor configured to eliminate interference by subtracting from the antenna signals the contribution estimated the estimator in order to obtain cleaned antenna signals;

the cleaned antenna signals configured to be supplied by at least one first sequence being used as antenna signals by at least one second sequence.

\* \* \* \* \*